United States Patent [19]

Kuwahara et al.

[11] Patent Number: 5,356,449
[45] Date of Patent: Oct. 18, 1994

[54] VAD PROCESS IMPROVEMENTS

[75] Inventors: Toru Kuwahara, Cary; Bret M. Mohlenhoff, Durham, both of N.C.

[73] Assignee: AT&T Bell Laboratories, Murray Hill, N.J.

[21] Appl. No.: 65,384

[22] Filed: May 24, 1993

[51] Int. Cl.⁵ .................................... C03B 37/023
[52] U.S. Cl. ................................. 65/421; 65/32.5; 65/17.4; 65/435; 65/427; 427/163.12
[58] Field of Search ............... 65/3.12, 18.2, 32.5; 427/163

[56] References Cited

U.S. PATENT DOCUMENTS

| | | | |
|---|---|---|---|
| 4,032,315 | 6/1977 | van der Steen | 65/32.5 |
| 4,154,592 | 5/1979 | Bailey | 65/2 |
| 4,286,978 | 9/1981 | Bailey et al. | 65/3.12 |
| 4,338,111 | 7/1982 | Edahiro et al. | 65/18.2 |
| 4,629,485 | 12/1986 | Berkey | 65/3.11 |
| 4,941,905 | 6/1990 | Narasimham | 65/3.12 |
| 4,978,378 | 12/1990 | Ito et al. | 65/3.12 |

Primary Examiner—Robert L. Lindsay
Attorney, Agent, or Firm—Roderick B. Anderson

[57] ABSTRACT

In a method for making optical fiber preforms, the time taken for sintering and annealing the clad or jacket layer is significantly reduced by only partially sintering the jacket soot boule in an atmosphere of helium. For example, instead of using one hundred forty-three minutes to sinter completely the soot boule, the boule is only partially sintered by heating in a helium atmosphere for fifty-nine minutes. At this stage of course, the soot boule is still partially porous and is generally opaque. The completion of the sintering and the annealing is then done in a single step in an atmosphere of nitrogen. Surprisingly, we have found that this process does not entrap nitrogen in the soot jacket layer to any noticeable or harmful extent, and the total time for sintering and annealing is significantly reduced.

14 Claims, 2 Drawing Sheets

VAD PROCESS IMPROVEMENTS

TECHNICAL FIELD

This invention relates to methods for making optical fiber and, more particularly, to methods for sintering and annealing deposited jacket soot on a glass rod as part of the process for making optical fiber.

BACKGROUND OF THE INVENTION

One of the steps in making glass optical fiber by the vapor axial deposition (VAD) method is the step of sintering or consolidating glass particles or "jacket soot" on a glass core rod. The glass jacket soot is deposited on a glass core rod by flame hydrolysis to form a porous body known as a soot boule. The soot boule is then sintered typically in an atmosphere of helium to form a solid glass clad layer over the glass core rod. After sintering, the clad layer typically contains imperfections due to trapped helium which are removed by annealing the structure in an inert atmosphere of a gas having a greater molecular weight than helium, typically nitrogen. As is pointed out, for example, in the Ito et al., U.S. Pat. No. 4,978,378, granted Dec. 18, 1990, annealing in an inert heavier gas is necessary for driving helium out of the glass clad layer, and nitrogen is the least expensive inert gas available for that purpose. (In this context, nitrogen is customarily treated as an inert gas.)

In our experience, it takes typically about one hundred forty-three minutes to sinter completely the glass soot boule in the helium atmosphere. Complete sintering results in a jacket layer of clear glass that has shrunk in volume about fifteen to twenty-five percent from the original glass boule volume. Annealing is then done typically for one hundred twenty minutes in a nitrogen atmosphere at a temperature that is typically kept below the glass transition temperature, which is about 1400 degrees Centigrade.

Optical fiber is very widely used, and as a consequence significant efforts have been made to reduce production costs. Any measure that would reduce significantly the time taken for sintering and annealing would therefore be regarded as a significant advance in the art.

SUMMARY OF THE INVENTION

In a method for making optical fiber preforms as generally described above, the time taken for sintering and annealing is significantly reduced by only partially sintering the jacket soot boule in an atmosphere of helium. For example, instead of using one hundred forty-three minutes to sinter completely the soot boule, the boule is partially sintered by heating it in a helium atmosphere for only fifty-nine minutes. At this stage, of course, the soot boule is still partially porous and is generally opaque. The completion of the sintering and the annealing is then done in a single step in an atmosphere of nitrogen. Surprisingly, we have found that this process does not entrap nitrogen in the soot jacket layer to any noticeable or harmful extent, and the total time for sintering and annealing is significantly reduced.

These and other objects, features and advantages of the invention will be better understood from a consideration of the following detailed description taken in conjunction with the accompanying drawing.

DETAILED DESCRIPTION

Figure 1:
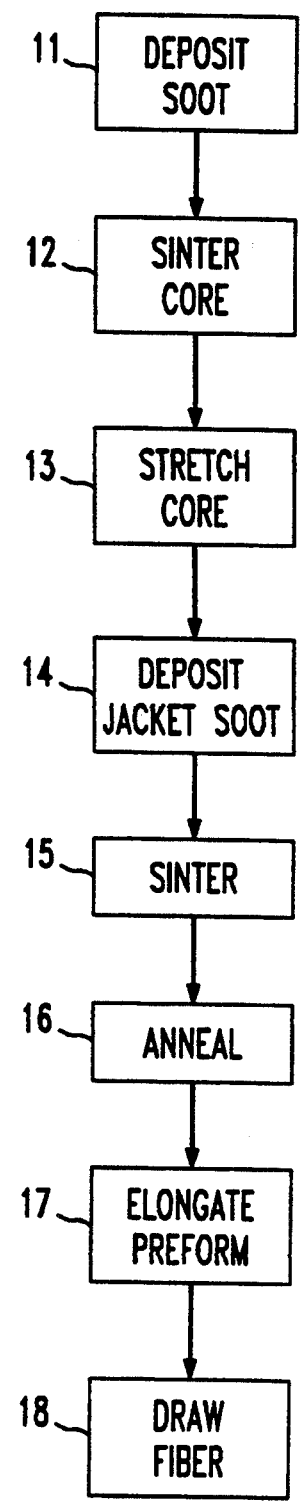
FIG. 1 is a flow chart diagram of a method for making optical fiber in accordance with the prior art.

Referring now to FIG. 1, the first step in making drawn optical fiber in accordance with the prior art vapor axial deposition (VAD) process is the step 11 of depositing glass core soot on a glass seed element. This is done by the flame hydrolysis method in which a pair of burners or torches react vaporized raw material to cause glass particles to collect on the seed element. In step 12, the core glass is consolidated or sintered in a furnace to make a solid glass core element. In step 13, the core is stretched to be in the shape of a cylindrical glass rod. In step 14, jacket soot is deposited on the core rod by the flame hydrolysis method. This is typically accomplished by a single burner or torch directing glass raw material within a flame toward the glass rod to create a deposited jacket soot boule.

In step 15, the jacket soot boule is sintered in a furnace by heating it above the glass transition temperature, typically to a temperature of 1500–1600 degrees Centigrade, to convert the deposited porous soot boule to solid clear glass. Sintering is normally done in a helium atmosphere, and an annealing step 16 is required to drive out helium molecules that may have been trapped in the glass during the sintering process. In the absence of annealing, the trapped helium may result in a bubble formation at high temperatures in step 18. Normally the annealing step is done at a temperature above 700 degrees Centigrade and below the glass transition temperature, as, for example, 900–1100 degrees Centigrade. In step 17, the jacketed or clad preform is elongated to form the preform from which glass optical fiber having core and clad layers is drawn, as designated by step 18. The clad layer corresponds to the deposited jacket soot and normally has a different refractive index from that of the core as is required for light transmission by the optical fiber.

It is to be understood that FIG. 1 merely summarizes the process for making glass optical fiber. For conciseness, and because the process is known in the art, various other steps such as profiling the glass at various stages, dehydrating the glass, and applying and removing various glass handle portions have not been described.

The invention is an improvement of steps 15 and 16, that of sintering and annealing the jacket soot. Certain steps, such as dehydration, that are necessary for sintering the core glass, are not required for the jacket or clad layer because the light transmitted by the optical fiber is contained primarily in the core. Nevertheless, considerable care must be taken to sinter and anneal appropriately the jacket soot to form a dependable solid glass clad layer for the optical fiber.

Sintering is normally done in an atmosphere of helium, which is the inert gas ambient having the least molecular weight. The gas in which sintering takes place is preferably an inert gas to prevent molecules in the atmosphere from reacting with the heated glass as it is being sintered to form a solid glass body. However, the gas could contain oxygen because glass (silica) contains oxygen. The inert gas should have a low molecular weight, as is true of helium, because gas molecules normally become trapped within the jacket layer during sintering, and annealing in a heavier gas ambient is required to remove them. Nitrogen is the favored annealing atmosphere because of its availability and low cost. In an atmosphere of nitrogen, annealing allows lighter helium molecules to escape from the sintered jacket or clad glass without allowing the absorption of heavier nitrogen molecules.

Sintering is typically done at a temperature of 1500–1600 degrees Centigrade to allow the porous glass soot boule to flow as is required for its consolidation into solid glass. Complete sintering, that is, complete conversion from a porous opaque boule to a clear solid glass layer, typically requires sintering for one hundred forty-three minutes for a soot boule of five hundred to one thousand millimeters in length. The annealing in a nitrogen atmosphere is typically done at a temperature of 1100° C. and typically requires one hundred twenty minutes for complete annealing. The total time for sintering and annealing is therefore typically two hundred sixty-three minutes. The cost of optical fiber is reflected generally in the process time it takes to make it, and with the invention this process time is significantly reduced.

Figure 2:
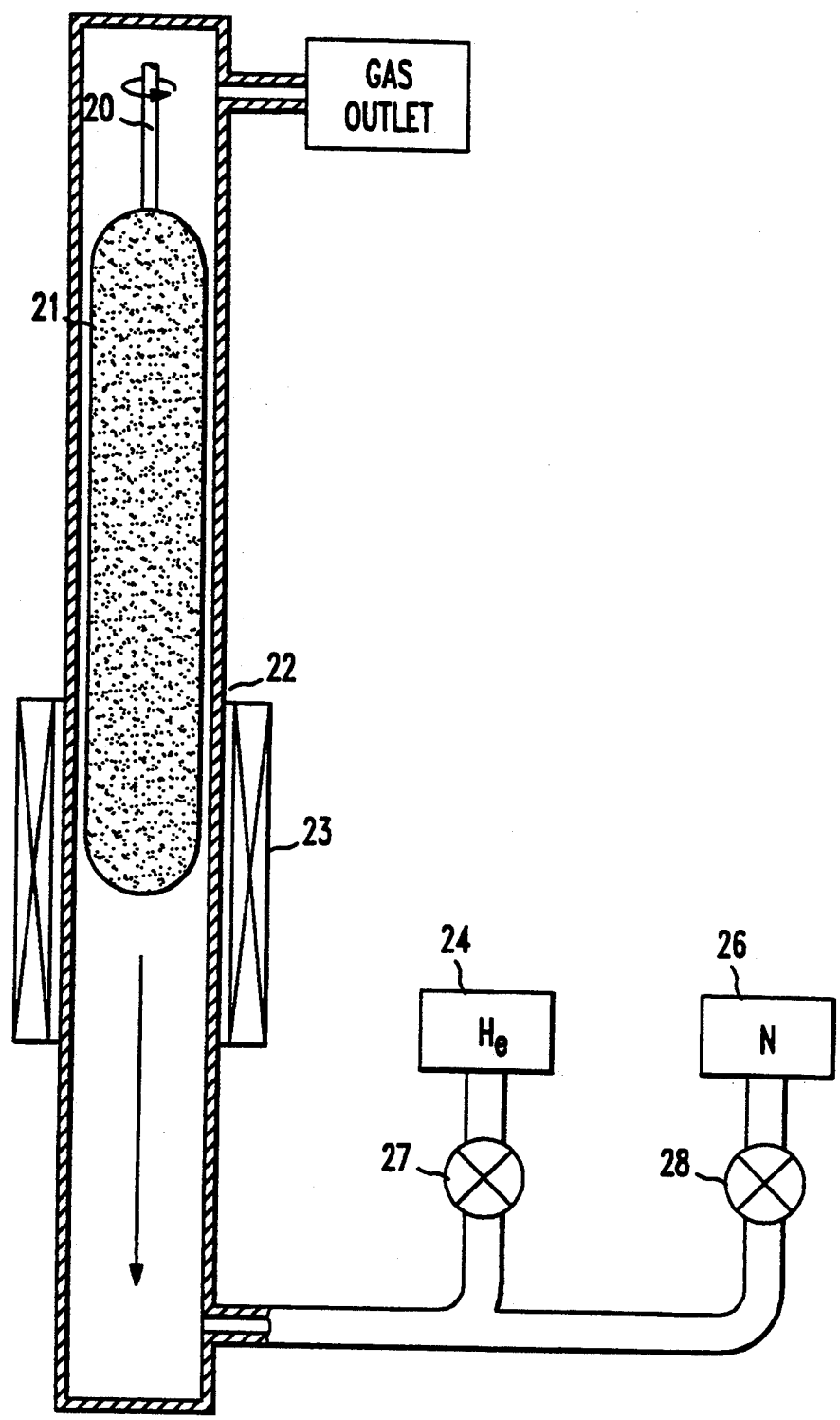
FIG. 2 is a schematic diagram of a method for sintering and annealing a jacket soot boule in accordance with an illustrative embodiment of the invention.

Referring now to FIG. 2, there is shown an illustrative embodiment of the invention in which a glass core rod 20 has been coated with a jacket soot boule 21 in accordance with step 14 of FIG. 1. The soot boule is sintered by locating it within a furnace 22 comprising a heating coil 23. The volume surrounded by heating coil 23 defines a hot zone having a temperature of 1500–1600 degrees Centigrade. The furnace is capable of being filled with helium from a helium source 24 or with nitrogen from a nitrogen source 26. Valves 27 and 28 control the flow of helium and nitrogen, respectively, into the furnace. The soot boule 21 is heated by lowering it through the hot zone while simultaneously rotating it. During the initial sintering step, only helium from source 24 is admitted, by way of valve 27, which flows through the furnace 22 at a flow rate of typically thirty liters per minute.

Complete sintering of the soot boule 21 under the conditions described would normally take one hundred forty-three minutes. In accordance with the invention, rather than completely sintering the soot boule, it is only partially sintered in the helium atmosphere by heating it, for example, for fifty-nine minutes. Thus, the partial sintering only takes 59/143 of the amount of time that would be required for complete sintering. Complete sintering results in a clear glass jacket that has shrunk fifteen to twenty-five percent from the size of the original soot boule. Partial sintering after fifty-nine minutes results in only about five to fifteen percent shrinkage, and leaves an opaque and partially porous soot boule 21.

After the partial sintering, valve 27 is turned off and valve 28 is turned on to replace the atmosphere in the furnace with one entirely of nitrogen. The nitrogen may have a flow rate of typically twenty liters per minute. In the nitrogen atmosphere, the sintering is completed, as is the entire annealing step. Sintering and annealing are typically accomplished at a temperature of 1500–1600 degrees Centigrade, rather than the 900–1100 degrees Centigrade that is normally used for annealing. We have found that completing the sintering step as well as annealing in an atmosphere of nitrogen results in a glass clad layer that has in it neither helium molecules nor nitrogen molecules to any detrimental extent. It is believed that the reason for this is that partial sintering consolidates the glass boule sufficiently to prevent the introduction of the heavier nitrogen molecules as the sintering is completed. On the other hand, the lower molecular weight helium molecules are forced out of the glass according to the conventional annealing mechanism. The step of completing the sintering and the annealing typically takes one hundred forty-one minutes which is not much longer than annealing by itself in the prior art process (one hundred twenty minutes). The overall sintering and annealing process time for the invention is two hundred minutes, as compared with two hundred sixty-three minutes for the prior art method.

In an illustrative embodiment, the initial soot boule was nine hundred millimeters long and the hot zone had an axial length of five hundred fifty millimeters. During initial sintering, the boule was moved through the hot zone, in an atmosphere of helium, at an axial rate of twenty millimeters per minute. After initial sintering, the boule had an axial length of eight hundred fifty millimeters due to shrinking. During final sintering and annealing, it was moved through the hot zone, in an atmosphere of nitrogen, at an axial rate of eight millimeters per minute.

While the sintering and annealing processes have been described in the context of a soot boule moving through a hot zone, this merely constitutes the preferred mode which is presently used at Litespec, Corporation for making optical fiber preforms. The sintering and annealing could take place in a furnace in which the soot boule is stationary, the entire soot boule being in a "hot zone." In the VAD process, it is normally not necessary to anneal the core glass after it has been sintered. This is because of its geometry, its lack of an interface with a solid substrate, with less consequent contamination, and its density profile, all of which result in less trapping of the helium molecules during sintering. The conventional jacket soot deposit of step 14 of FIG. 1, on the other hand, is done at a higher deposition rate to save time, has an annular geometry, and a different density profile, all of which make the jacket soot susceptible to helium trapping during sintering; this, in turn, requires the annealing step. Thus, the invention is not normally needed in the sintering step 12 of FIG. 1.

Wherever there is glass soot deposition on a solid substrate, particularly at a relatively high rate, the invention may be useful to reduce the sintering and annealing time required for its conversion to clear glass. For example, the invention may be useful with the outside vapor deposition (OVD) process, which also includes the step of depositing glass soot on a glass rod by flame hydrolysis at a relatively high rate, thus requiring annealing after sintering.

While helium has been described for the partial sintering process, and nitrogen for the annealing process, other inert gases or oxygen could be used as is known in the art. As mentioned before, it is generally preferable that the gas ambient during annealing be of a higher molecular weight than that used during at least the initial partial sintering step. If desired, longer sintering in the helium can be done, but of course this would tend to make the overall process longer. In the example described, partial sintering takes less than half the time and results in less than half the total sintering to be done on the soot boule. The invention significantly reduces overall process time, but at this juncture we have not determined the maximum amount of time that can be saved by using the invention. If there is too little partial sintering in helium, nitrogen will be trapped in the glass as sintering is completed.

Various other embodiments and modifications may be made by those skilled in the art without departing from the spirit and scope of the invention.

We claim:

1. A method for making glass bodies comprising the steps of:
   depositing by flame hydrolysis glass soot on a substrate to form a glass soot boule;
   locating the glass soot boule in a furnace;
   introducing helium into the furnace;
   partially sintering the soot boule comprising the step of heating the glass soot boule in the furnace in a substantially helium atmosphere;
   before the soot boule is completely sintered, changing the atmosphere within the furnace to an atmosphere containing substantially no externally applied helium;
   completing the sintering of the soot boule within said furnace to convert said boule entirely to a glass preform portion and annealing said glass preform portion;
   the steps of completing the sintering and annealing the preform portion being performed in said furnace in an atmosphere substantially free of externally applied helium, said atmosphere comprising a substantially inert gas that is heavier than helium.

2. The method of claim 1 wherein:
   during the step of partially sintering the soot boule, flowing substantially pure helium through the furnace;
   and during the step of completing the sintering and the annealing, flowing substantially pure nitrogen through the furnace.

3. The method of claim 1 wherein:
   the soot boule has a central axis;
   during the partial sintering step, axially moving the soot boule through a hot zone having a temperature of 1500-1600 degrees Centigrade;
   and during the step of completing the sintering and the annealing step, axially moving the soot boule through a hot zone having a temperature of 1500-1600 degrees Centigrade.

4. The method of claim 1 wherein:
   the duration of the partial sintering step is less than half the duration that would be required for complete sintering under the same conditions used for partial sintering;
   and the step of completing the sintering and annealing is done in an atmosphere containing gas selected from the group consisting of inert gas and oxygen, and mixtures thereof.

5. The method of claim 4 wherein:
   the duration of the partial sintering is approximately 59/143 of the duration that, under the same conditions, would be required for complete sintering.

6. The method of claim 1 wherein:
   the substrate upon which glass soot is deposited is a glass cylinder.

7. The method of claim 2 wherein:
   the substrate upon which the glass soot is deposited is a glass cylinder;
   the soot boule is approximately 500 to 1000 millimeters in axial length;
   the heat zone is approximately five hundred fifty millimeters in length;
   and during both the partial sintering step and the completion of sintering and the annealing step, the boule is axially moved through the heat zone while being rotated on its central axis.

8. A method for making optical fiber comprising the steps of: depositing core soot on a glass body; consolidating the core soot to make a glass core; stretching the core to make a glass rod; depositing jacket soot on the glass rod by the flame hydrolysis method; sintering and annealing the jacket soot, thereby to form an optical fiber preform; and drawing glass optical fiber from the glass preform; wherein the improvement comprises:
   partially sintering the jacket soot by heating it in an atmosphere of a first gas having a relatively low molecular weight, a significant portion of said jacket soot being unsintered at the termination of said partial sintering step;
   and thereafter completing the sintering of said jacket soot and annealing the sintered jacket soot by heating the jacket soot in an atmosphere of a second gas having a higher molecular weight than the first gas.

9. The method of claim 8 wherein:
   the first gas is helium, and the second gas is nitrogen.

10. The method of claim 9 wherein:
    during the partial sintering step, axially moving the soot boule through a hot zone having a temperature of 1500-1600 degrees Centigrade;
    and during the step of completing the sintering and the annealing step, axially moving the soot boule through a hot zone having a temperature of 1500-1600 degrees Centigrade.

11. The method of claim 9 wherein:
    the duration of the partial sintering step is less than half the duration that would be required for complete sintering, but is sufficient to substantially prevent entrapment of nitrogen in the sintered glass.

12. The method of claim 11 wherein:
    the duration of the partial sintering is approximately 59/143 of the duration that, under the same conditions, would be required for complete sintering.

13. The method of claim 8 wherein:
    the first gas and the second gas are both inert gases.

14. The method of claim 8 wherein:
    the first gas and the second gas are both selected from the group consisting of inert gases including nitrogen and oxygen, and mixtures thereof.

* * * * *

UNITED STATES PATENT AND TRADEMARK OFFICE
CERTIFICATE OF CORRECTION

PATENT NO.: 5,356,449
DATED: October 18, 1994
INVENTOR(S): T. Kuwahara, B. M. Mohlenhoff It is certified that error appears in the above-identified patent and that said Letters Patent is hereby corrected as shown below:

Column 6, line 7
    "2" should read --3--.

Signed and Sealed this

Twenty-first Day of March, 1995

Attest:

BRUCE LEHMAN

Attesting Officer      Commissioner of Patents and Trademarks